United States Patent [19]

Hintner et al.

[11] 4,188,072
[45] Feb. 12, 1980

[54] BRAKE ACCELERATOR DEVICE FOR AN AIR BRAKE SYSTEM OF A RAILWAY VEHICLE

[75] Inventors: Josef Hintner; Georg Stäuble, both of Munich, Fed. Rep. of Germany

[73] Assignee: Knorr-Bremse GmbH, Munich, Fed. Rep. of Germany

[21] Appl. No.: 914,754

[22] Filed: Jun. 12, 1978

[30] Foreign Application Priority Data

Jun. 21, 1977 [DE] Fed. Rep. of Germany ....... 2727762

[51] Int. Cl.² .............................................. B60T 15/32
[52] U.S. Cl. ...................................................... 303/69
[58] Field of Search ................................... 303/68–70, 303/81–83

[56] References Cited
U.S. PATENT DOCUMENTS

| | | | |
|---|---|---|---|
| 644,356 | 2/1900 | Hibbard | 303/69 |
| 1,879,643 | 9/1932 | Thomas | 303/69 |
| 2,994,565 | 8/1961 | McClure et al. | 303/82 |

Primary Examiner—Duane A. Reger
Attorney, Agent, or Firm—Edmund M. Jaskiewicz

[57] ABSTRACT

A brake control device has a selective release accelerator which responds only to a normal release subsequent to an increase of brake line pressure initiated by the operator's brake valve. A first piston has one side subjected to air line pressure and the other side subjected to pressure in an auxiliary reservoir. The first piston controls an inlet valve to connect the emergency reservoir to the brake line. A second piston has one side subjected to brake line pressure and its other side to pressure in the auxiliary reservoir and monitors the first piston. The side of the first piston subjected to auxiliary reservoir pressure is connected through a throttled connection to the auxiliary reservoir when the brake line pressure is smaller than or equal to the auxiliary reservoir pressure. This throttled connection is interrupted when the brake line pressure reaches a predetermined value higher than the auxiliary reservoir pressure.

7 Claims, 1 Drawing Figure

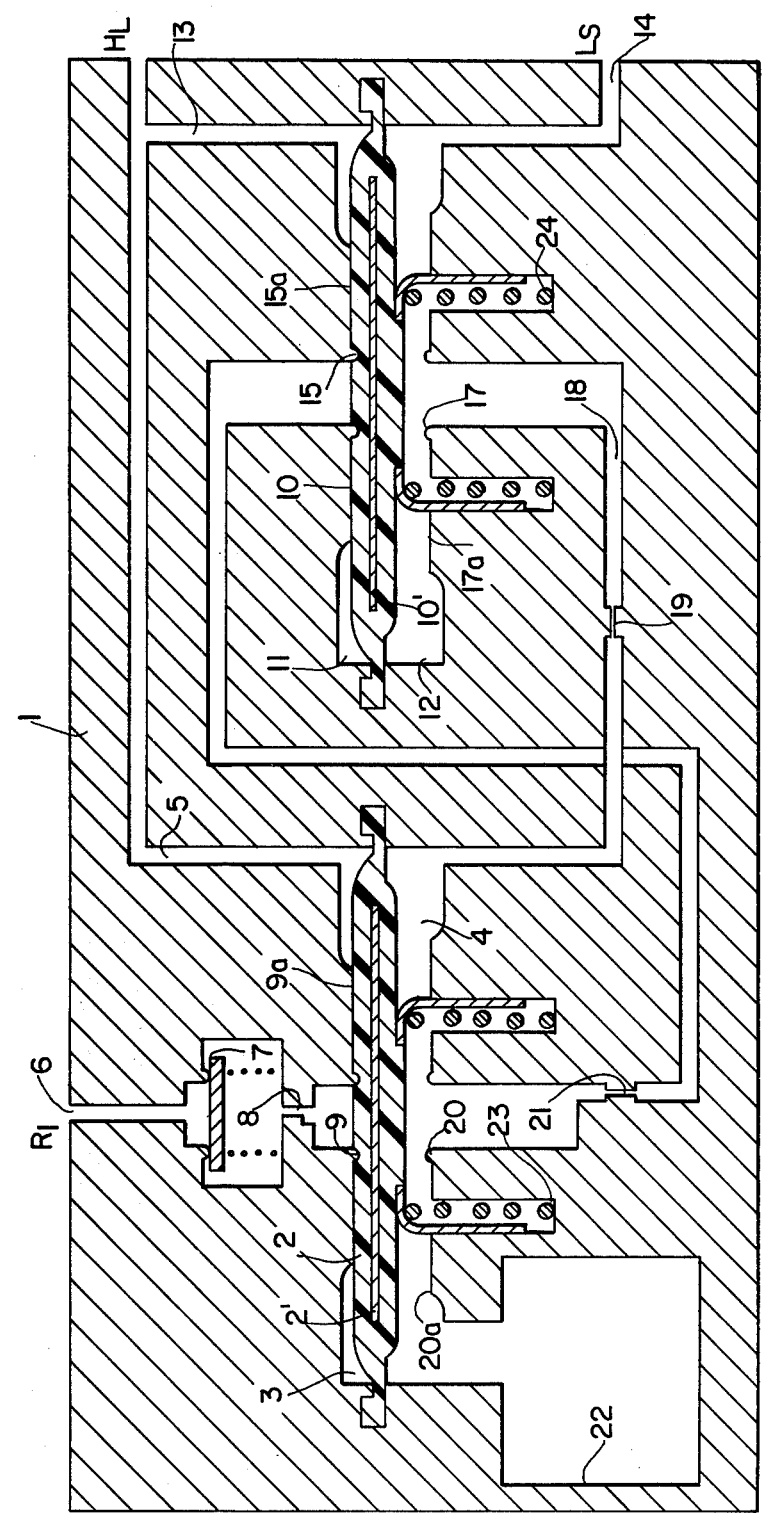

BRAKE ACCELERATOR DEVICE FOR AN AIR BRAKE SYSTEM OF A RAILWAY VEHICLE

The present invention relates to a brake control device for an air brake system of a railway vehicle and having a release accelerator, more particularly, to a selective release accelerator responsive only to a normal release.

Each railway vehicle of a train of railway vehicles is provided with a brake control valve device connected to the brake line extending throughout the length of the vehicle. The interconnected brake lines of coupled railway vehicles forms a brake line extending throughout the length of the train and the pressure in this brake line is regulated by the train operator through a control valve in order to brake the train and to subsequently release the brakes. The brake control device comprises a service brake element monitoring the brake valve so as to subject the brake cylinder to the action of air from the auxiliary reservoir during a braking operation and a release valve for venting the brake cylinder when it is desired to release the brakes after braking. The service brake element includes the usual structure for filling an auxiliary reservoir, such as passageway 38 disclosed in U.S. Pat. No. 2,994,565 which is well-known to those skilled in the art. The brake control valve includes a main piston subjected on one side to the action of brake line pressure and on the other side to the action of pressure in the auxiliary reservoir. There is also a release accelerator which is controlled by the difference of the brake line pressure and the pressure in the auxiliary reservoir which during a release operation connects the emergency reservoir to the brake line in order to rapidly build up the pressure in the brake line.

The brake control device as described above together with a release accelerator have been provided with various structures and designs. Most known brake control devices having release accelerators will cause a release of the brakes under three different conditions. These conditions include a normal release which is initiated by the driver's brake valve due to an increase of the brake line pressure, a manual release resulting from an actuation of an outlet valve to reduce the pressure in the auxiliary reservoir and an unintentional release which may occur as result of loss of pressure in the auxiliary reservoir.

Such known brake control devices with release accelerators thus cannot distinguish between the above three release conditions and will thus be actuated should any of the above three conditions occur.

It is therefore the principal object of the present invention to provide a novel and improved brake control device having a selective release accelerator which responds only to a normal release occurring as a result of an increase in brake line pressure initiated by the operator's brake valve.

According to one aspect of the present invention there is provided a brake control device for an air brake system of a railway vehicle which has a release accelerator controlled by the difference of the brake line pressure and the auxiliary reservoir pressure which, in a brake release operation, connects the emergency brake reservoir to the brake line for a rapid increase in pressure in the brake line. A first piston has one side subjected to the action of brake line pressure and the other side to the action of pressure in the auxiliary reservoir and actuates an inlet valve which controls a passage from the emergency reservoir to the brake line. The first piston is monitored by a second piston which is subjected on one side to brake line pressure and on the other side to auxiliary reservoir pressure. A chamber at the side of the first piston subjected to auxiliary reservoir pressure is connected through a throttle connection to the auxiliary reservoir when the brake line pressure is less than or equal to the pressure in the auxiliary reservoir. This connection is interrupted when the brake line pressure is higher than the auxiliary reservoir pressure.

Other objects and advantages of the present invention will be apparent upon reference to the accompanying drawing which schematically illustrates in section the brake accelerator device according to the present invention.

Proceeding next to the drawing, a specific embodiment of the present invention will be described in detail.

An accelerator device according to the present invention which is a component of a brake control device as described above has a housing 1. Within the housing there is a first piston 2 on one side of which there is defined a chamber 3 and on the other side of which there is defined a first chamber 4. The piston 2 is in the form of a diaphragm piston so as to separate the chambers 3 and 4 from each other. In order that the piston may be substantially rigid in the regions of valve seats to be subsequently described but also in the region of adjacent housing ring sections, a rigid metal plate 2' is included within the piston 2 substantially as shown in the drawing.

The chamber 3 is connected to a brake line 5 which in turn is connected to the brake line of the vehicle. The housing 1 is also provided with a passage 6 which is connected to an emergency reservoir, not shown, and the passage 6 is connected through a check valve 7, a serially connected throttle opening or nozzle 8 and a valve seat 9 to the chamber 3.

In the position of the piston 2 as illustrated, the valve seat 9 is engaged by one side of the piston 2 and is completely covered so that the connection between the emergency reservoir line 6 and the brake line 5 is interrupted or closed.

There is also provided a second piston 10 which separates chambers 11 and 12 formed on opposing sides of the piston 10. The piston 10 is similarly of the diaphragm piston type and is provided with a rigid metal plate 10' similar to that of the piston 2.

The chamber 11 is connected through line 13 to the brake line 5 and the second chamber 12 is connected through a line 14 with the auxiliary reservoir, which is not shown.

The chamber 11 includes a valve seat 15 which surrounds an opening to the chamber 11 from a brake line 16. The brake line 16 is provided with a throttle opening 21 therein and is connected through valve seat 20 to the chamber 4.

The chamber 12 similarly comprises a valve seat 17 which is also engageable by a surface of the piston 10 and surrounds an opening of passage 18 to the chamber 12. The passage 18 also has therein a throttle or restricted opening 19 and connects to the chamber 4.

In the illustrated position of the piston 10, the valve seat 15 is completely engaged by a side of the piston 10 so as to close off or interrupt the connection from the brake line 5,13 to the chamber 4. Also in the illustrated position of the piston 10, the valve seat 17 is open so that the auxiliary reservoir line 14 is connected through chamber 12 and line 18 to the chamber 4. In addition, the chamber 4 is continuously connected to a volume 22.

A spring 23 acts upon the piston 2 to urge the piston 2 in the direction to close the valve seat 9. In a similar manner, a spring 24 acts upon the piston 10 to urge the piston 10 in a direction to close the valve seat 15. When the valve seat 9 is open, the emergency reservoir is connected through line 6, check valve 7, throttle opening 8 and chamber 3 to the brake line 5. When the valve seat 15 is open and when valve seat 20 is open, the brake air line 5,13 is connected through the chamber 11, branch line 16, through chamber 4 and the auxiliary reservoir branch line 18 and chamber 12 to the line 14 connected to the auxiliary reservoir.

Should the pressures in the chambers 3 and 4 be equalized, the piston 2 will close off the valve seat 9 because of the force exerted on the piston 2 by the spring 23. Similarly, when the pressure is equalized in the chambers 11 and 12, the piston 10 will close off the valve seat 15 as result of the force exerted by spring 24.

The release accelerator according to the present invention operates in the following manner:

Under normal release which would occur when the pressure in brake line 5 is increased in response to the actuation by the operator of the brake valve, a small pressure differential will occur between the brake line pressure and the auxiliary reservoir pressure since the pressure in the auxiliary reservoir will remain constant and the brake line pressure will be increased in consequence of the release operation. Accordingly, the valve seat 15 will be opened and the brake line 5,13 will be connected to the auxiliary air reservoir through chamber 11, line 16, nozzle 21, valve seat 20, chamber 4, line 18 including nozzle 19, valve seat 17, chamber 12 and the line 14. The nozzle or throttle opening 21 has a relatively small cross-section so that the pressure difference between the brake line pressure and the auxiliary reservoir pressure will continue to increase.

In the event that there is a greater pressure difference between the brake line pressure and the auxiliary reservoir pressure, the increased brake line pressure will move the piston 10 into position to close valve seat 17 whereupon the connection between the chamber 4 and the auxiliary reservoir will be interrupted. According to the present invention, the spring 23 exerts such a force that in the event of such a pressure differential between the brake line pressure and the auxiliary reservoir pressure, the spring 23 will maintain the piston 2 in its position closing the valve seat 9.

Should the pressure difference between the brake line 5 and the auxiliary reservoir continue to increase and the pressure in the chamber 4 cannot be increased at a sufficiently rapid rate through the throttle opening 21, the valve seat 9 will be opened. Opening of valve seat 9 will cause air to flow from the emergency reservoir through line 6, check valve 7, throttle opening 8 and the chamber 3 into the brake line 5. As result, the pressure in the brake line will be rapidly increased to accelerate brake release.

Upon opening of valve seat 9, the valve seat 20 will be closed so that the pressure difference between the chambers 3 and 4 can no longer be equalized through the brake line 5,13, chamber 11, valve seat 15, line 16, throttle opening 21 and the valve seat 20. The valve seat 9 will remain open until refilling of the auxiliary reservoir has been completed and the pressures in the brake line and the auxiliary reservoir are equal. The auxiliary reservoir will be filled through a known filling structure, as described in U.S. Pat. No. 2,994,565, while the valve 17 remains closed. The pressure in the chamber 4 will be increased through valve seat 17, line 18 and throttle opening 19 to the pressure in chamber 12. When the pressure equilibrium occurs, spring 23 will open valve seat 20 and press the piston 2 against valve seat 9 to terminate the release acceleration. Similarly, as the pressure is equalized in chambers 11 and 12, the piston 10 will close off valve seat 15 under the force of spring 24 as described above.

When an outlet valve, not shown in the drawing, but known in the art, is actuated to cause a manual release, the pressure in the auxiliary reservoir will decrease rapidly while the pressure in the brake line remains constant. The resulting pressure difference between the brake line pressure and auxiliary reservoir pressure will initially cause the piston 10 to be moved downwardly as shown in the drawing to open valve seat 15. Subsequently, valve seat 17 will be closed by the piston 10 in the same manner as in the case of normal release decribed above. Although chambers 4 and 12 are connected through line 18, because of the throttle opening 19 in line 18 a rapid pressure drop in chamber 4 corresponding to the rapid pressure drop in chamber 12 will not occur.

The chamber 4 is connected through throttle opening 21, line 16, valve seat 15 and chamber 11 with the brake line 5,13. Since the pressure in the brake line remains constant during a manual release operation, no pressure difference will be established between the chambers 3 and 4. Accordingly, the valve seat 9 will remain closed by the piston 2. This means that no release acceleration will occur as result of the introduction of air from the emergency reservoir into the brake line.

In the event the pressure in the auxiliary air reservoir slowly decreases because of leakage or other defects, the pressure in the brake line 5 will remain constant. Under these circumstances also the pressure difference between the brake line and the auxiliary reservoir will bring about an opening of the valve seat 15. As a result, the auxiliary reservoir will be supplied with air from the brake line through chamber 11, valve seat 15, line 16, throttle opening 21, chamber 4, line 18 with throttle opening 19, chamber 12 and the line 14.

In the event that a larger pressure loss should occur in the auxiliary reservoir it will not be possible to adequately supply air through the throttle opening or nozzle 19. Accordingly, the increasing pressure difference between the brake line pressure and the auxiliary reservoir pressure will cause the piston 10 to move downwardly as shown in the drawing to close valve seat 17. Except for the increased pressure loss in the auxiliary reservoir, the release accelerator according to the present invention will occur in the same manner as under a manual release as described above. Thus, in the event of a slow or "creeping" pressure loss in the auxiliary reservoir, no release acceleration will be initiated by the accelerator device.

Thus it can be seen that the present invention has disclosed a simple but effective release accelerator which is responsive only in the event of a normal release and not for a manual release or an unintentional release such as caused by leakage in the auxiliary reservoir.

It will be understood that this invention is susceptible to modification in order to adapt it to different usages and conditions, and accordingly, it is desired to comprehend such modifications within this invention as may fall within the scope of the appended claims.

What is claimed is:

1. A brake accelerator for an air brake system of a railway vehicle and comprising a first piston having one side subjected to air pressure in a brake line and a second side subjected to air pressure in an auxiliary reservoir, a first passage connected from an emergency reservoir and opening to said one side of said first piston, means defining an inlet valve in said first passage actuated by said first piston, a second piston having one side subjected to air pressure in a brake line and a second side subjected to air pressure in an auxiliary reservoir, means defining a first chamber on said second side of said first piston, means defining a second chamber at said second side of said second piston, a second passage including said second chamber connecting said first chamber to the auxiliary reservoir when the pressure in the brake line is less than or equal to the pressure in the auxiliary reservoir, and means for closing said second passage when the air pressure in said brake line reaches a predetermined value higher than the brake pressure in the auxiliary reservoir.

2. A brake accelerator as claimed in claim 1 and further comprising a third passage connecting said first chamber to the auxiliary reservoir when said second passage is closed.

3. A brake accelerator as claimed in claim 1 and further comprising means defining a volume chamber and said volume chamber is connected to said first chamber.

4. A brake accelerator as claimed in claim 2 wherein said inlet valve is on said first side of said first piston and a second valve is on the second side of said first piston, a valve seat surrounding the connection of said third passage with said first chamber and engageable by said second valve, a second valve seat surrounding the connection of said third passage to a third chamber at the first side of said second piston and engageable by the first side of said second piston to close said third passage, said means for closing said second passage comprising a third valve seat surrounding the connection of said second passage to said second chamber and engageable by the second side of said second piston.

5. A brake accelerator as claimed in claim 4 and further comprising first and second springs urging said first and second pistons respectively in directions to engage the first sides of said pistons with said inlet valve and second valve seat respectively.

6. A brake accelerator as claimed in claim 1 wherein there is a first throttle opening in said second passage.

7. A brake accelerator as claimed in claim 2 wherein there is a second throttle opening in said third passage.

* * * * *